United States Patent [19]

Gyarmati

[11] Patent Number: 5,045,137
[45] Date of Patent: * Sep. 3, 1991

[54] PROCESS OF JOINING SILICON NITRIDE BODIES AND INSERT FOR FACILITATING SUCH JOINING

[75] Inventor: Ernö Gyarmati, Linnich-Tetz, Fed. Rep. of Germany

[73] Assignee: Forschungzentrum Julich GmbH, Julich, Fed. Rep. of Germany

[*] Notice: The portion of the term of this patent subsequent to Apr. 17, 2008 has been disclaimed.

[21] Appl. No.: 448,163

[22] Filed: Dec. 8, 1989

Related U.S. Application Data

[63] Continuation-in-part of Ser. No. 115,775, Oct. 30, 1987, Pat. No. 4,917,843.

[30] Foreign Application Priority Data

Dec. 21, 1988 [DE] Fed. Rep. of Germany ....... 3842984

[51] Int. Cl.$^5$ ............................................. B32B 18/00
[52] U.S. Cl. ......................................... 156/89; 264/60; 264/62; 264/332; 428/325
[58] Field of Search ................... 156/89; 428/210, 325, 428/384, 420, 446, 698; 416/241 B; 501/53, 54, 55, 56, 97; 264/60, 62, 332

[56] References Cited

U.S. PATENT DOCUMENTS 3,966,885  6/1976  May ................................. 416/241 B
4,347,089  8/1982  Loehman ............................. 156/89
4,484,972  11/1984  Ebata et al. ......................... 156/89
4,917,843  4/1990  Gyarmati et al. ..................... 264/60

FOREIGN PATENT DOCUMENTS 2744620  4/1979  Fed. Rep. of Germany ........ 156/89

Primary Examiner—Caleb Weston
Attorney, Agent, or Firm—Frishauf, Holtz, Goodman & Woodward

[57] ABSTRACT

For reliably improving the strength of the composite body formed by hot-pressing together the silicon nitride surfaces at which parts of the composite body are joined, one of the silicon nitride surfaces to be joined is covered by a set of three thin layers applied by sputtering, the first a nitrogen-deficient layer of $SiN_x$ where $1.3 > x$ and $\geq 0$, a second layer of $SiN_y$ in which $y > 1.33$ and a third layer like the first. The first and third layers have the same thickness and the second layer has twice that thickness. The three layers together have a thickness not exceeding 3 μm and the overall composition of the set of three layers is $Si_3N_4$. With such a set of layers, the wetting of the surfaces of the bodies to be joined during hot-pressing is substantially improved, resulting in better bonding of the parts across the joint seam. An insert of silicon nitride fitting between the surfaces to be pressed together and coated on both sides with respective sets of three layers, as above described, is useful for facilitating a hot-pressed joint.

10 Claims, 1 Drawing Sheet

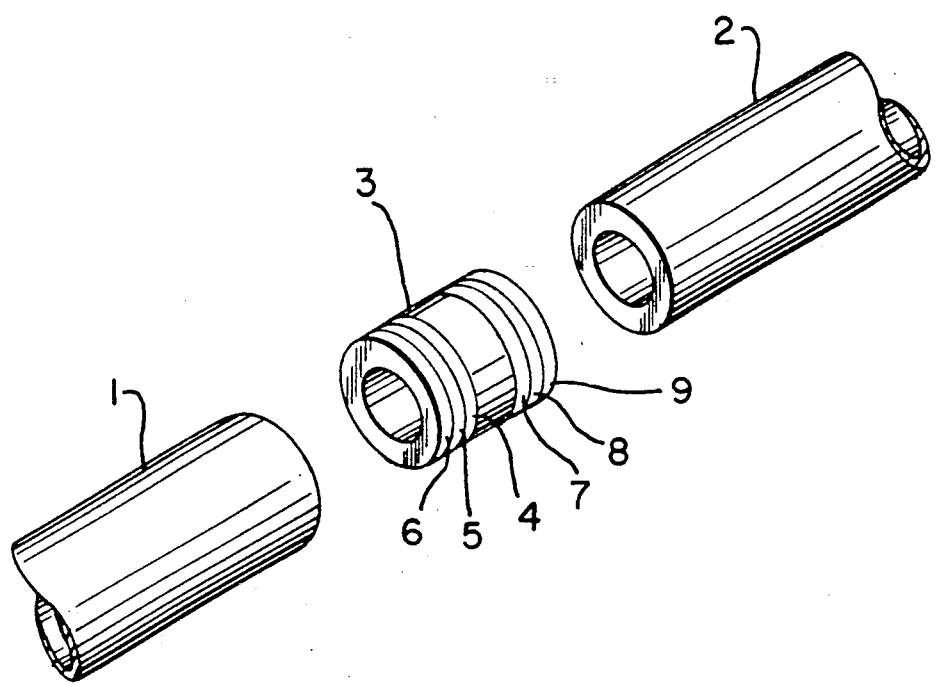

PROCESS OF JOINING SILICON NITRIDE BODIES AND INSERT FOR FACILITATING SUCH JOINING

This application is a continuation-in-part of application Ser. No. 115,775 filed Oct. 30, 1987 on which U.S. Pat. No. 4,917,843, was granted.

This invention concerns joining of molded parts made of silicon nitride or having a surface of silicon nitride at least at the surfaces at which the parts are to be joined, and more particularly a joining process including hot-pressing at pressures of at least 10 MPa and temperatures above 1500° C., at which pressures and temperatures bonding is obtained by virtue of the presence of nitrogen surplus and nitrogen-deficient silicon nitride layers in the formation of the joint seam. The invention also concerns an insert piece of silicon nitride for insertion between parts to be thus joined.

In a process known from "Thin Solid Films" Vol. 151 (1987), pages 223–233, provision is made for the presence of a nitrogen excess and of a nitrogen deficiency in the material of the respective parts to be joined in the region of the boundary layers that are to go into each other, so that merely by reactive rearrangement and diffusion into each other of the complementary layers, growing of the seam together across the boundary layer can result in such a way that the seam is brought practially to disappear.

Slight overall deviations from the desired silicon nitride composition $Si_3N_4$ do not interfere with the known process, since at the high temperatures of joining all superfluous silicon can evaporate and superfluous nitrogen can diffuse away.

In the known process the polished surfaces to be joined were sputtered with complementary silicon nitride layers, for example, more or less complementary layers of $Si_3N_{5.5}$ and $Si_3N_{2.5}$ or else a layer with a nitrogen-excess combination with a silicon layer. During the sputtering of such layers care was taken by observing and controlling the nitrogen pressure as well as other factors such as absolute pressure, spacing, applied electric field etc., for the generation of particular compositions after the optimal conditions regarding all these factors had been explored by preliminary experiments, and careful control of the conditions of all these factors was deemed to be important for obtaining good results.

SUMMARY OF THE INVENTION

It has been found that the strength of the composite body across the seam can be considerably improved and reliably obtained by a special arrangement of layers disposed over the surfaces to be joined.

Briefly, a high-strength joint is obtainable by the provision of a set of three layers extending along the surfaces to be joined, composed of two nitrogen-deficient layers of the composition $SiN_x$ where $1.3 > x$ and $\geq 0$ with a nitrogen-surplus layer between them having the composition $SiN_y$ in which $y > 1.33$ with the amounts of nitrogen deficiency and nitrogen surplus essentially complementing each other to provide the overall composition $Si_3N_4$.

In other words, in accordance with the invention care is taken to assure that the layer of the bond-promoting set of layers adjoining the silicon nitride surfaces to be joined is made of a silicon nitride layer which, with reference to nitrogen, is below stoichiometric composition and more particularly of the composition $SiN_x$ in which $1.3 > x \geq 0$.

It was unexpectedly discovered that in this way the wetting of the surfaces of the bodies to be joined during the joining process was substantially improved, so that the bonding of the parts across the joint seam, according to the invention, is notably promoted.

It was found to be particularly effective for the outer layers of the set of layers to be composed of silicon itself or of a silicon nitride layer having a composition with a nitrogen content that does not exceed the proportion $SiN_{1.0}$.

The layer thickness of the nitrogen-deficient outer layers is preferably half as great as the thickness of the intermediate layer and, in particular, the aggregate thickness of the three layers is at most about 3 μm and preferably about 1 μm.

It is effective to provide the set of layers only on one of the polished surfaces to be joined. It is especially effective to utilize the thin silicon nitride insert having the same contour as the surfaces to be joined For example, a silicon nitride ring can be used to join pipe or tube ends, the ring having opposite joining surfaces both of which are provided with the above-mentioned set of layers, as shown in the annexed drawing.

BRIEF DESCRIPTION OF THE DRAWINGS

The single FIGURE of the drawing is a schematic perspective view of an insert for joining the ends of two cylindrical silicon nitride tubes.

DESCRIPTION OF THE ILLUSTRATED EMBODIMENT

In the drawing there are shown the ends of two silicon nitride tubes, 1 and 2, which are to be joined by an insert 3. The insert 3 is a ring having flat surfaces perpendicular to its axis and the diameter and the radial thickness of the ring 3 are the same as the diameters and the radial thicknesses of the tubing 1 and 2. On each of the oppositely facing flat surfaces of the ring 3 a set of layers in accordance with the invention is located, with the thickness of the layers and of the entire set greatly exaggerated in the drawing so as to be able to show them easily. The thickness of the insert 3 by which its opposite sides are separated from each other amounts to a most 5 mm. On the side facing the tubing piece 1, beginning at the surface of the ring 3, there is a set of three layers 4, 5 and 6 in accordance with the invention and on the side of the ring 3 facing the tubing piece 2, beginning at the surface of the ring 3, there are three more layers 7, 8, 9 of another set of layers according to the invention.

In the illustrated case these layers are of the preferred composition. Thus, the layers 4, 6, 7 and 9 are of the composition $SiN_x$ in which $x = 0.55$ and the layers 5 and 8 have a composition $SiN_x$ in which x equals about 1.88. The overall thickness of each set of three layers is 2 μm, with the layers 5 and 8 being 1 μm thick and the other layers 0.5 μm thick, although that is not to be gathered from the drawing.

INTRODUCTION TO PROCESS EXAMPLES

As will be shown in the following examples, successful results can be obtained with joint temperatures of from 1550° C. to 1650° C. Higher temperatures are usable, but not required, so that it is practical to utilize joining temperatures between 1500° C. and 1700° C.

The bond-promoting layering according to the invention corresponds basically to the following composition, expressed in a form corresponding to a reaction between, on the one hand, the inner layer and on the other hand two outer layers:

$$ySi_3N_{4+x} + xSi_3N_{4-y} \rightarrow (x+y)Si_3N_4$$
$$0 \leq x \leq 2$$
$$0 \leq y \leq 4$$

Simple examples for layer combinations are as follows:

1) $Si_3N_{4+2} + sSi_3N_{4-1} \rightarrow (1+2)Si_3N_4$
   ($SiN_2 + 2SiN \rightarrow 3SiN_{1.33}$)
2) $4Si_3N_{4+1} + 1Si_3 \rightarrow 5Si_3N_4$
   ($4SiN_{1.66} + Si \rightarrow 5SiN_{1.33}$)
3) $2Si_3N_{4+1.5} + 1.5Si_3N_{4-2} \rightarrow 3.5Si_3N_4$
   ($2SiN_{1.83} + 1.5SiN_{0.67} \rightarrow 3.5SiN_{1.33}$)

The layer thicknesses that are to be applied can then be calculated by utilizing the known specific weights or specific gravities of silicon, of silicon nitride and of the nitrogen-deficient and nitrogen-surplus layers.

EXAMPLES

The surfaces to be joined of prismatic $Si_3N_4$ samples of HP quality (obtained from the firm Hertel-International, Fed. Rep. Germany) were polished, cleaned in an ultrasonic bath and dried. The samples were then placed in a vacuum apparatus for sputtering of $SiN_x$ layers and the polished surfaces were etched by bombardment with $Ar^-$ ions immediately before sputtering. The sputtering apparatus included a planar HF magnetron cathode (Z400 of the firm Leybold Heraeus, Fed. Rep. Germany).

The samples provided with sputtered layers as here described were then bonded in a laboratory hot press with opposing $Si_3N_4$ pieces, the pressing chamber being several times evacuated and flushed with $N_2$ prior to hot-pressing. Prior to pressing the nitrogen pressure was set at 40 KPa. The following table shows the composition in thickness of the applied layering (column 1), the bonding temperature and pressure (columns 2 and 3) and the obtained strength values. The joining time was 120 minutes.

a nitrogen-surplus covering layer having the composition $SiN_y$ in which $y > 1.33$, and a second nitrogen-deficient layer having the composition $SiN_x$ in which $x < 1.3$, the respective compositions and the relative thicknesses of the layers being such as to complement an average composition of substantially $Si_3N_4$ for the combination of the three layers, the total thickness of said three layers not exceeding about 3 μm;

fitting together said surfaces to be joined; and joining said parts and said surfaces together by hot-pressing with at least 10 MPa pressure and at a temperature above 1500° C.

2. The process of claim 1, wherein each said nitrogen-deficient layer has a composition $SiN_x$ in which $x$ does not exceed 1 and may be 0.

3. The process of claim 1, wherein said first and second nitrogen-deficient layers both have thicknesses which are half the thickness of said nitrogen-surplus layer interposed between them.

4. The process of claim 1, wherein the total thickness of said three layers is not less than 0.75 μm nor greater than 1.25 μm.

5. The process of claim 1, wherein the provision of each of said layers is performed by sputtering.

6. The process of claim 1, wherein said layers are provided on only one of said surfaces to be joined.

7. The process of claim 1, wherein the temperature of said hot-pressing does not exceed 1700° C.

8. A process for joining molded parts respectively having surfaces of silicon nitride at least for surfaces to be joined by the process, comprising the steps of:

obtaining an insert of silicon nitride of a configuration whereby said insert fits between said molded part surfaces to be joined by the process and providing, when fitted between said molded parts, a separation of said molded parts not exceeding 5 mm and having first and second opposite surfaces of a configuration for fitting said molded part surfaces to be joined;

providing on both said first and said second opposite surfaces of said insert a first nitrogen-deficient covering layer having the composition $SiN_x$ in which $x < 1.3$, a nitrogen-surplus layer covering said first nitrogen-deficient layer and having the composition $SiN_y$ in which $y > 1.33$, and a second nitrogen-deficient layer covering said nitrogen-surplus layer and having the composition $SiN_x$ in which $x < 1.3$, the respective compositions and the relative thicknesses of the layers being such as to complement, on each side of said insert, an average composition of substantially $Si_3N_4$ for the combination of the

| 1<br>Layer thickness<br>Layer kind [μm] | 2<br>Temp. [°C.] | 3<br>Pressure [MPa] | 4<br>$\sigma_{4pR1}$<br>[MPa] | 5<br>$\sigma$(max)<br>MPa |
|---|---|---|---|---|
| 0.125Si/1.0SiN₂/0.125Si | 1550 | 21 | | |
| 0.125Si/1.0SiN₂/0.125Si | 1650 | 21 | 446 ± 106 | 652 |
| 0.125Si/1.0SiN₂/0.125Si | 1550 | 10.5 | 142 ± 91 | |
| 0.125Si/1.0SiN₂/0.125Si | 1650 | 10.5 | 468 ± 113 | 664 |
| 0.3SiN₀.₅/0.6SiN₁.₅₆/0.3SiN₀.₅ | 1550 | 21 | 228 ± 102 | |
| 0.3SiN₀.₅/0.6SiN₁.₅₆/0.3SiN₀.₅ | 1650 | 21 | 360 ± 142 | 576 |
| 0.3SiN₀.₅/0.6SiN₁.₅₆/0.3SiN₀.₅ | 1550 | 10.5 | 354 ± 168 | 623 |
| 0.3SiN₀.₅/0.6SiN₁.₅₆/0.3SiN₀.₅ | 1650 | 10.5 | 405 ± 159 | 607 |
| 0.3SiN₁.₀/0.6SiN₁.₇/0.3SiN₁.₀ | 1550 | 21 | 437 ± 87 | 584 |
| 0.3SiN₁.₀/0.6SiN₁.₇/0.3SiN₁.₀ | 1650 | 21 | 399 ± 83 | 554 |

Although the invention has been described with reference to particular examples, it will be understood that variations and modifications are possible within the inventive concept.

I claim:

1. A process for joining molded parts respectively having surfaces of silicon nitride at least for the surfaces to be joined, comprising the steps of:

providing on at least one of said surfaces to be joined, in sequence, a first nitrogen-deficient covering layer having the composition $SiN_x$ in which $x < 1.3$, three layers, the total thickness of said three layers in each case not exceeding about 3 μm;

fitting said insert having said layers thereon between said surfaces to be joined of said respective molded parts and hot-pressing said parts with said insert therebetween to join said parts with a pressure of at least 10 MPa and at a temperature above 1500° C.

9. An insert piece of silicon nitride for joining molded parts respectively having surfaces of silicon nitride at least for the surfaces which are to participate in the joint, said insert having first and second opposite sides of respective configurations for fitting said surfaces of said respective parts to be joined and separated from each other by a thickness A adapted to the surface area of the joining surface and having, on each of said first and second sides, a nitrogen-deficient layer covering the respective side of said insert and having the composition $SiN_x$ in which $x<1.3$, a nitrogen-surplus layer covering said first nitrogen-deficient layer and having the composition $SiN_y$ in which $y>1.33$ and a second nitrogen-deficient layer covering said nitrogen-surplus layer and having the composition $SiN_x$ in which $x<1.3$, the respective compositions and the relative thicknesses of the layers being such as to complement an average composition of substantially $Si_3N_4$ for the combination of the three layers, the total thickness of said layers in each case not exceeding about 3 μm.

10. An insert piece according to claim 9, wherein said thickness A amounts to at most 5 mm.

* * * * *